(12) United States Patent
Cole et al.

(10) Patent No.: US 7,426,736 B2
(45) Date of Patent: Sep. 16, 2008

(54) BUSINESS SYSTEMS MANAGEMENT SOLUTION FOR END-TO-END EVENT MANAGEMENT USING BUSINESS SYSTEM OPERATIONAL CONSTRAINTS

(75) Inventors: David William Cole, Austin, TX (US); Otto Vaughn Kitchens, Atlanta, GA (US); Robert Nawratil, Round Rock, TX (US); Tedrick Neal Northway, Wood River, IL (US); Paul David Peterson, Round Rock, TX (US); Chris Edward Terry, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 10/443,679

(22) Filed: May 22, 2003

(65) Prior Publication Data

US 2004/0237077 A1 Nov. 25, 2004

(51) Int. Cl.
*G06F 9/54* (2006.01)
*G06F 13/00* (2006.01)
*G06F 11/30* (2006.01)

(52) U.S. Cl. .................. 719/318; 709/223; 709/224
(58) Field of Classification Search .............. 709/223, 709/224; 719/318
See application file for complete search history.

(56) References Cited

U.S. PATENT DOCUMENTS

| | | | |
|---|---|---|---|
| 5,345,586 A | 9/1994 | Hamala et al. | 395/650 |
| 6,304,892 B1 * | 10/2001 | Bhoj et al. | 709/202 |
| 6,505,254 B1 | 1/2003 | Johnson et al. | 709/239 |
| 6,681,232 B1 * | 1/2004 | Sistanizadeh et al. | 707/104.1 |

(Continued)

FOREIGN PATENT DOCUMENTS

WO WO 98/18076 4/1998

OTHER PUBLICATIONS

U.S. Appl. No. 09/726,014, Cole et al., Business Systems Management: Realizing End-to-End Enterprise Systems Management Solution, filed Nov. 29, 2000.

(Continued)

*Primary Examiner*—Li B Zhen
(74) *Attorney, Agent, or Firm*—Duke W. Yee; David A. Mims, Jr.

(57) ABSTRACT

The present invention provides a method, apparatus, and computer program product for implementing a business systems management solution for end-to-end event management. The present invention realizes a number of business systems management functionalities, including defining event databases and means for event monitoring and correlating a customer's business functions by using an enterprise view focused on a system of applications, operating systems, connections, and physical components. Together these components make up a business system as defined by the customer. As such, a business system can cross technology platforms, physical space, and comprise multiple applications, or a business system could be limited to a single platform, location, and application. Components that comprise the business system and enterprise-level event management structure are defined, created, and modified to align the Information Technology with the business system's processes and to aid in the management of the information technology with respect to the business system.

11 Claims, 9 Drawing Sheets

U.S. PATENT DOCUMENTS

| | | | |
|---|---|---|---|
| 6,983,321 B2* | 1/2006 | Trinon et al. | 709/224 |
| 2004/0024767 A1* | 2/2004 | Chen | 707/100 |
| 2004/0205101 A1* | 10/2004 | Radhakrishnan | 709/200 |

OTHER PUBLICATIONS

U.S. Appl. No. 10/219,633, Cole et al., Method and System for Implementing a Business Process with a Service Provisioning Model, filed Aug. 15, 2002.

U.S. Appl. No. 10/219,697, Cole et al., Method and System for Prioritizing Business Processes in a Service Provisioning Model, filed Aug. 15, 2002.

U.S. Appl. No. 10/252,979, Chan et al., Adaptive Problem Determination and Recovery in a Computer System, filed Sep. 20, 2002.

* cited by examiner

BUSINESS SYSTEMS MANAGEMENT SOLUTION FOR END-TO-END EVENT MANAGEMENT USING BUSINESS SYSTEM OPERATIONAL CONSTRAINTS

CROSS REFERENCE TO RELATED APPLICATIONS

The present invention is related to U.S. patent applications entitled "BUSINESS SYSTEMS MANAGEMENT: REALIZING END-TO-END ENTERPRISE SYSTEM MANAGEMENT SOLUTION", Ser. No. 09/726,014 filed on Nov. 29, 2000; "METHOD AND SYSTEM FOR IMPLEMENTING A BUSINESS PROCESS WITH A SERVICE PROVISIONING MODEL", Ser. No. 10/219,633 filed on Aug. 15, 2002; and "METHOD AND SYSTEM FOR PRIORITIZING BUSINESS PROCESSES IN A SERVICE PROVISIONING MODEL", Ser. No. 10/219,697 filed on Aug. 15, 2002; all of which are assigned to the same assignee and incorporated herein by reference.

BACKGROUND OF THE INVENTION

1. Technical Field

The present invention relates to the management of business systems. Specifically, the present invention is directed to a method, apparatus, and computer program product for providing end-to-end management of business systems.

2. Description of Related Art

Managing a customer's business systems is a difficult task. Business systems comprise interrelated components, such as hardware, software, networks, data, connections, databases, processes, and procedures. Business processes may use multiple technologies of disparate types. Business processes may also span multiple lines of business both internally and externally, and may be managed by disjoint groups with little systems management integration. The scope of management for business systems is generally narrow, and typically extends no further than problem management or addressing incidents, where teams of people are assigned to resolve the issues and follow up with a root cause analysis. Current methods do not completely address the business enterprise from an end-to-end perspective. To properly address the business from an end-to-end perspective, all aspects of the business system must be considered at an enterprise-level. A customer's enterprise is defined as the sum of that customer's Information Technology (IT) environment. Such an enterprise may be comprised solely out of components from a single traditional IT management tower, or out of components from any combination of "towers" including distributed, midrange, and host environments. At the most detailed level, any processor (e.g. components 104, 106, and 108 in FIG. 1 and 200 in FIG. 2) is an example of "tower". In this context "towers" are realms of organizational responsibility. In IT management environments, towers are traditionally organized by technology type.

Events that affect the operation of the business system need to be managed. An event represents a change in the state of a component of a business system that could impact the operation of the business system. The following examples are provided to illustrate several of different types of events, but these examples are not meant to be exhaustive. An event, for example, could reference the availability of a web-based business process via a systems management monitor that is monitoring the up or down status of an HTTP daemon running on a web server that is a component part of the process. In another example, an event could reference the performance of a web-based business process via a systems management monitor that is monitoring the amount of free CPU cycles available on a server that is a component part of the process. An event could also be a news wire flash that indicates a change in the stock market that could ultimately have impact upon a business process or function.

Methods for addressing events have evolved from previous management models, which were infrastructure-centric, tower-oriented, and highly segmented. Many issues are not addressed by current methods. For example, in many cases the technology components are managed along tower boundaries and thus relationships between those events (symptoms vs. cause) are not known. This can result in erroneous action. Additionally, existing processes for event management may have no context as to how the business process is actually performing based upon the business impact of those events. Providing an event management solution that addresses business process impact enables the management of specific events to be prioritized based on the measurable financial costs of business process disruptions and missed service level targets and commitments. People often do not receive the correct information to support the business before and at the time when an event occurs, which can impact the operation of the business system. Furthermore, enterprise or business system information technology environments are typically comprised of components that are geographically dispersed. As such, existing processes for system management do not usually expand past those same geographic boundaries.

Therefore, it would be advantageous to have an improved method, apparatus, and computer program product for implementing a business systems management solution for end-to-end event management.

SUMMARY OF THE INVENTION

The present invention provides a method, apparatus, and computer program product for implementing a business systems management solution for end-to-end event management. A preferred embodiment of the present invention realizes a number of business systems management functionalities, including defining event databases and means for event monitoring and correlating a customer's business functions by using an enterprise view focused on a system of applications, operating systems, connections, and physical components. Together these components (applications, operating systems, connections, and physical components) make up a business system as defined by the customer. As such, a business system can cross technology platforms, physical space, and comprise multiple applications, or a business system could be limited to a single platform, location, and application. Components that comprise the business system and enterprise-level business system event management structure are defined, created, and modified to align the Information Technology with the business system's processes and to aid in the management of the information technology with respect to the business system. Monitors are created and deployed to detect events in the business system. Event data is stored and used in the evaluation of other events. Metrics and billing are provided to the customer. An ongoing service of monitoring the business system using substructures of the enterprise-level business system event management structure to perform end-to-end event management is performed for the life of a service contract.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention provides a comprehensive design to enable and provide a service provider with the necessary information, such as process steps and worktables, to define, create, and perform an end-to-end event service across heterogeneous technologies.

Figure 1:
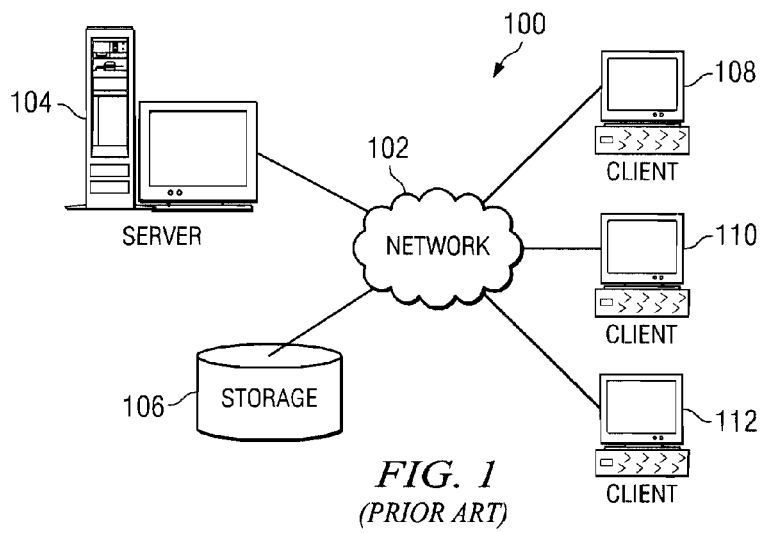
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers, transactional systems, or network computers. In the depicted example, server 104 provides data, such as boot files, operating system images, and applications to clients 108-112. Clients 108, 110, and 112 are clients to server 104, or application to application such as in transactional systems. Network data processing system 100 may include additional servers, clients, and other devices not shown. In the depicted example, network data processing system 100 is the Internet with network 102 representing a worldwide collection of networks and gateways that for example, use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

A business system may span a single or multiple networks, such as for example, network data processing system 100. Also, a business system may contain multiple client-server, client-to-client, and stand-alone data processing systems.

Figure 2:
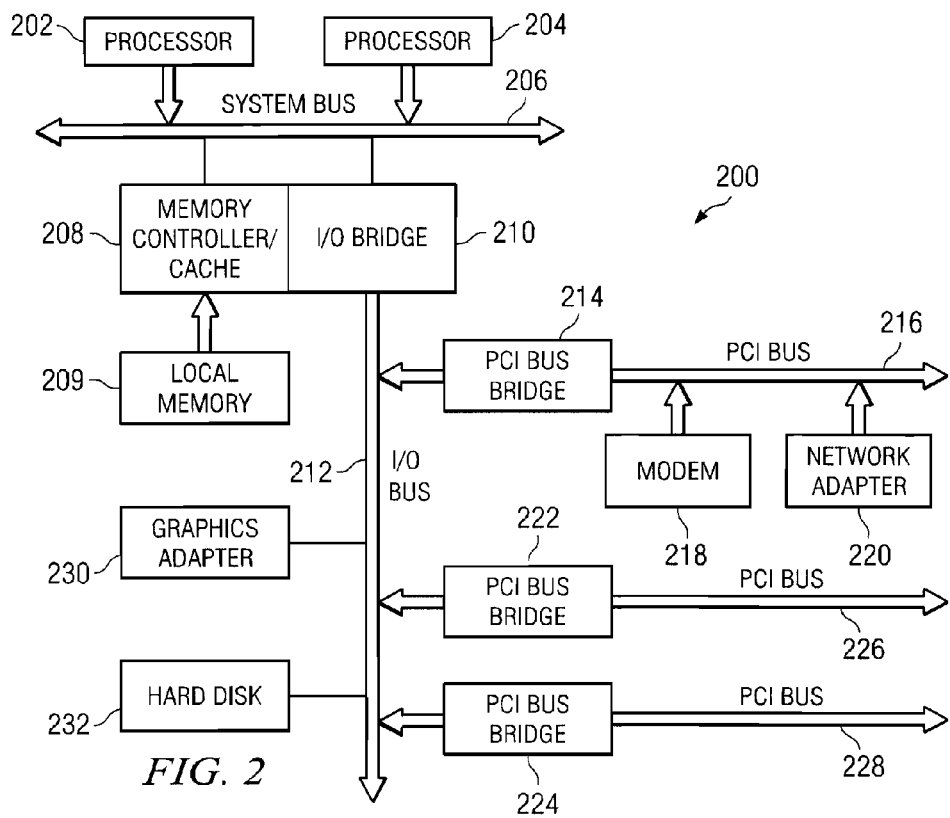
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
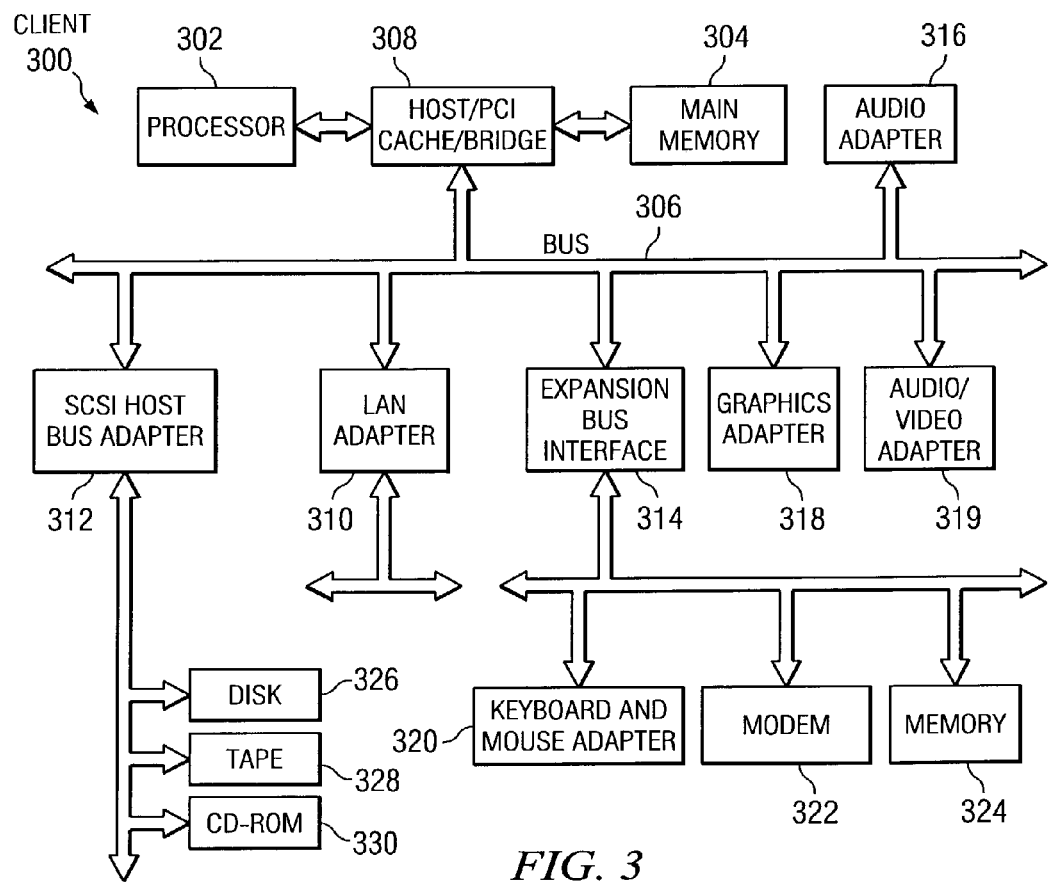
FIG. 3 is a block diagram of a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as "Windows XP", which is a trademark of Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. In a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

A business system may contain multiple servers and transaction systems such as Straight Through Processing-STP. Other examples are server 104 in FIG. 1 and server 200 in FIG. 2, multiple clients, such as for example, client 108, 110, and 112 in FIG. 1 and client 300 in FIG. 3, and multiple storage containers, such as for example, storage 106 in FIG. 1.

Figure 4:
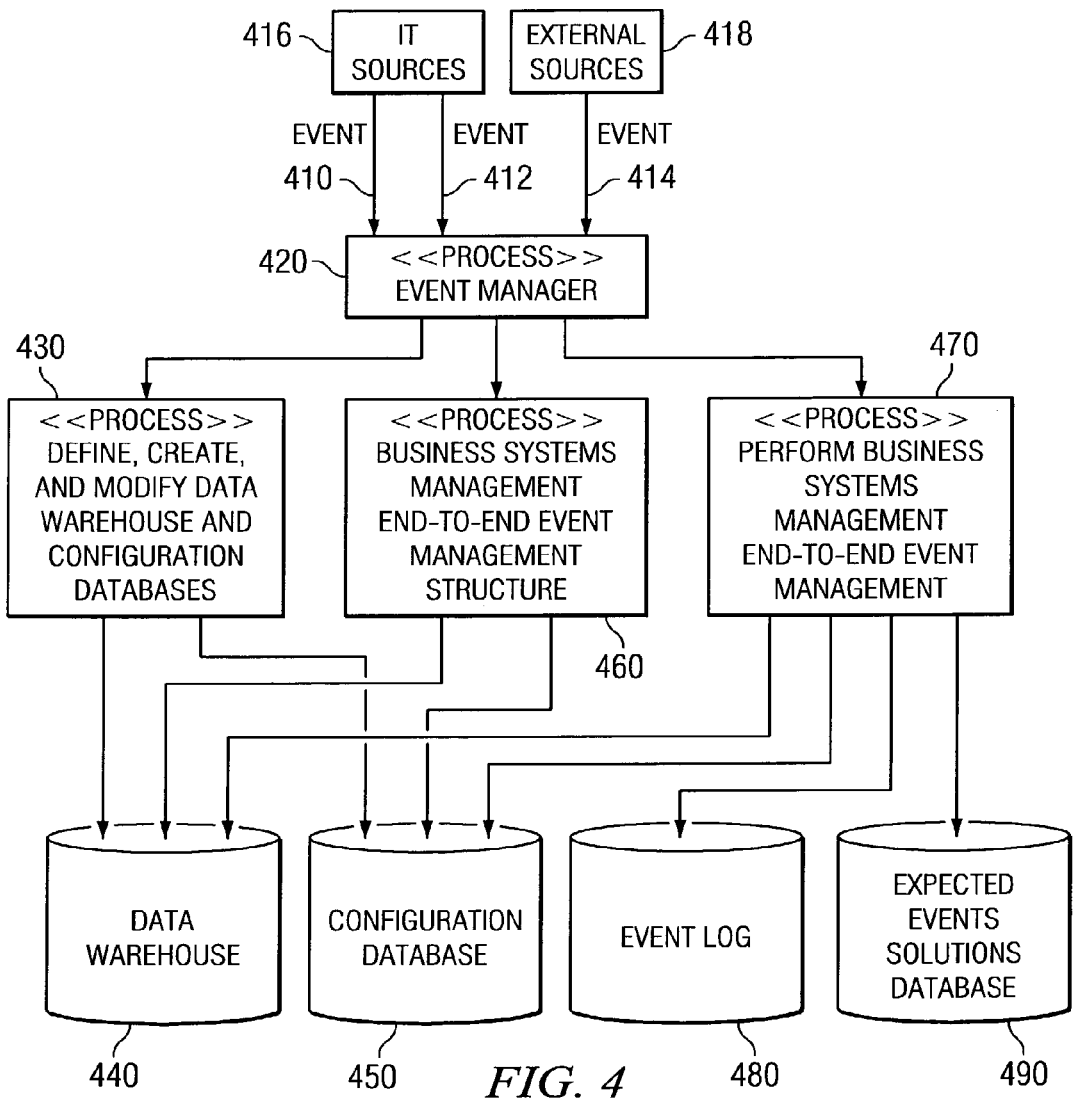
FIG. 4 is a block diagram of a business systems management solution for end-to-end event management in accordance with a preferred embodiment of the present invention.

Referring now to FIG. 4, a block diagram is displayed illustrating a business systems management solution for end-to-end event management in accordance with a preferred embodiment of the present invention.

A preferred embodiment of the present invention realizes a number of business systems management functionalities, including defining event databases and means for monitoring and correlating a customer's business functions by using an enterprise view focused on a system of applications, operating systems, connections, and physical components. Together these components (applications, operating systems, connections, and physical components) make up a business system as defined by the customer. A business system can cross technology platforms, physical space, and comprise multiple applications, or a business system could be limited to a single platform, location, and application. Events 410, 412, and 414 represent a state change in a component of a business system, which has the potential to impact the operation of the system. Events may be expressed by IT infrastructure components, such as IT sources 416. External sources 418 can also create an event, such as event 414 which may be, for example, a news flash that the stock market just crashed. Event manager 420 has overall responsibility for day-to-day events, such as for example, events 410, 412, and 414, that may impact service or the information technology environment. Define, create, and modify data warehouse and configuration databases process 430 plans, procures and installs the databases required to support the event data and configurations for end-to-end event management. Process 430 enables the setup and modification of data warehouse 440 and configuration database 450. Process 430 is described in more detail in FIG. 5. Data warehouse 440 is the keeper of information related to the events generated, such as for example, events 410, 412, and 414. Configuration database 450 is the component database that maintains the complete set of components and their associated relationships such as, for example, business processes, technology platforms, physical space, location, connectivity, and applications.

Business systems management end-to-end event management structure process 460 establishes an enterprise-level business system event management structure comprising substructures that are used to perform end-to-end event management. The substructures may include monitors for monitoring for events, as well as other tools that may be used in event detection and management. Process 460 sets up and modifies the monitors, tools, conventions, and approaches as related to the defined enterprise-level business system event management structure. Monitors are created and deployed across the business system, and perform business systems management end-to-end event management process 470 (q.v.) determines whether or not the events that the monitors detect are significant to the enterprise. For example, an event is significant when the event impacts a service level agreement as perceived by a customer. Process 460 is described in more detail in FIG. 6 and FIG. 10. Data warehouse 440 and configuration database 450 are updated by process 460 as substructures are established or modified. Perform business systems management end-to-end event management process 470 is the process that actually performs event management. Once the substructures are defined, process 470 can begin monitoring the business system as defined by process 460, analyzing event information obtained by the deployed monitors. Process 470 also provides the ability to update the event management method to incorporate unforeseen event types or additional types of hardware or software. Process 470 is described in more detail in FIG. 7, FIG. 8, and FIG. 9. Process 470 stores event information in event log 480 and expected events solutions database 490. Process 470 also updates data warehouse 440 and configuration database 450. Real-time data is captured and stored in data warehouse 440, configuration database 450, event log 480, and expected events solutions database 490, thus providing the capability to access current and historical data for reporting and future trending. This described data is used in the common event correlation process in FIG. 8.

Figure 5:
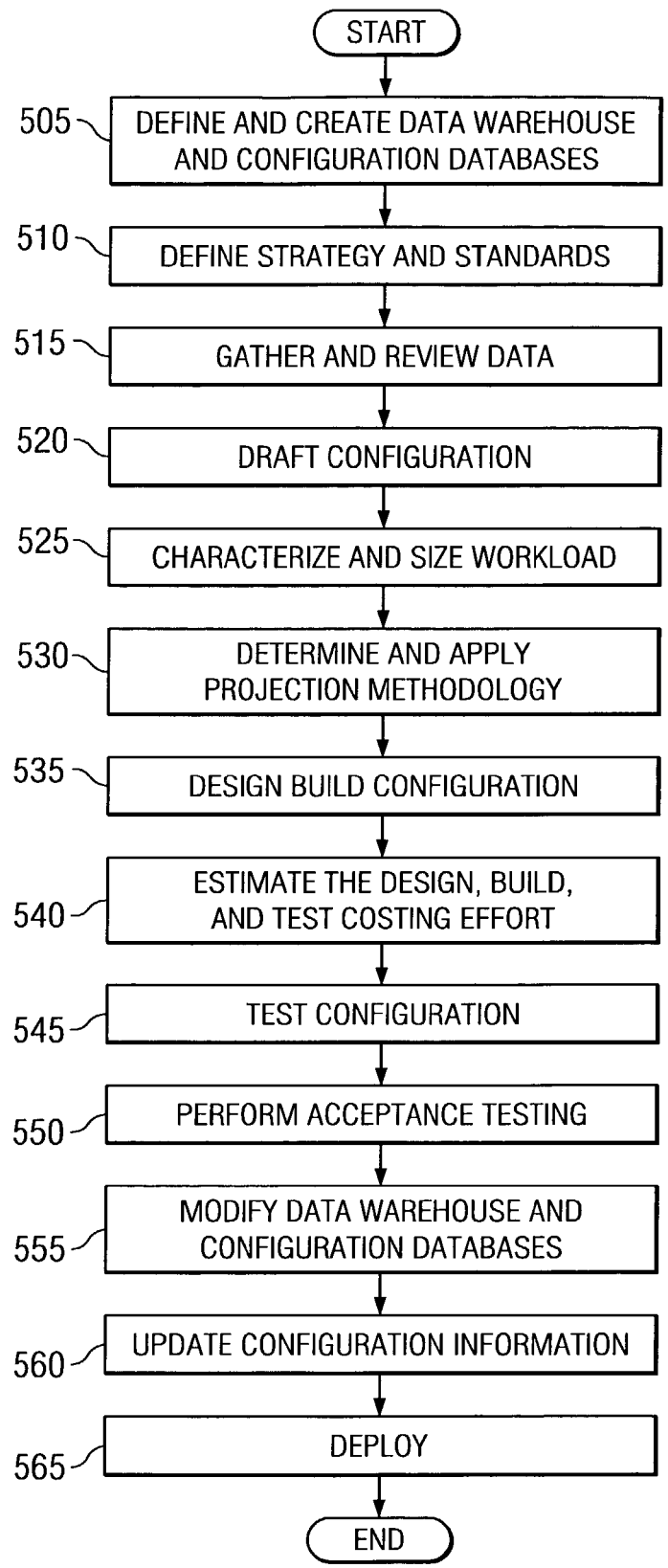
FIG. 5 is a flowchart of a process to define, create, and modify data warehouse and configuration databases in accordance with a preferred embodiment of the present invention.

Next, FIG. 5 is a flowchart of a process to define, create, and modify data warehouse and configuration databases in accordance with a preferred embodiment of the present invention. Process 430 in FIG. 4 is an example of this type of process. A request is made to define and create the data warehouse and configuration databases, and data is gathered to define the databases (step 505). Strategies and standards for obtaining and organizing the data warehouse and configuration database information are defined by reviewing business system operational constraints from such sources as reference databases, customer strategies, and business and technical drivers, such as enterprise strategies, business policies, and service level commitments (step 510). Data is gathered and reviewed to determine the requirements to meet the customer's request (step 515). Workload requirements and data are gathered and reviewed, and load requirements are determined to develop a draft configuration of the data warehouse and configuration databases (step 520). The period of interest, magnitude of usage, duration of usage, usage data, and resources used are determined in order to characterize and size the business system's workload (step 525). Business drivers, linear regression, historical data and trends, percentage of change over periods of time, available workload data, and customer input are used to determine suitable projection techniques to evaluate the appropriateness and source of data and to choose the most applicable methodologies to project the business system's resource requirements. For example, the business driver methodology relates a business component, such as a number of orders or a number of inquiries, to system usage. The determined projection techniques are applied to produce forecast projections and assumptions (step 530). Detailed specifications for hardware, software, and design connectivity requirements are developed and reviewed to design a build configuration (step 535). Projected costs (i.e., costing effort) for designing, building and testing the configuration are estimated (step 540). Costs may include, for example, estimated number and skill of resources needed to complete the configuration, vendor costs, and costs for hardware and software. The configuration is tested to validate the data warehouse and configuration databases (step 545). Customer acceptance testing is performed on the configuration of the databases (step 550). Requests for modifying resources, such as adding or removing hardware or software, are reviewed and existing resources are evaluated. Investment needs for additional resources are identified and requirements for the changed configurations are documented. The costing effort is estimated, changes are made as required, and the changes are tested to validate the modified data warehouse and configuration databases (step 555). The configuration information is updated and documented (step 560). The configuration is deployed and tested following the implementation plan, communication plan, and work plan tasks (step 565) with the process terminating thereafter.

Figure 6:
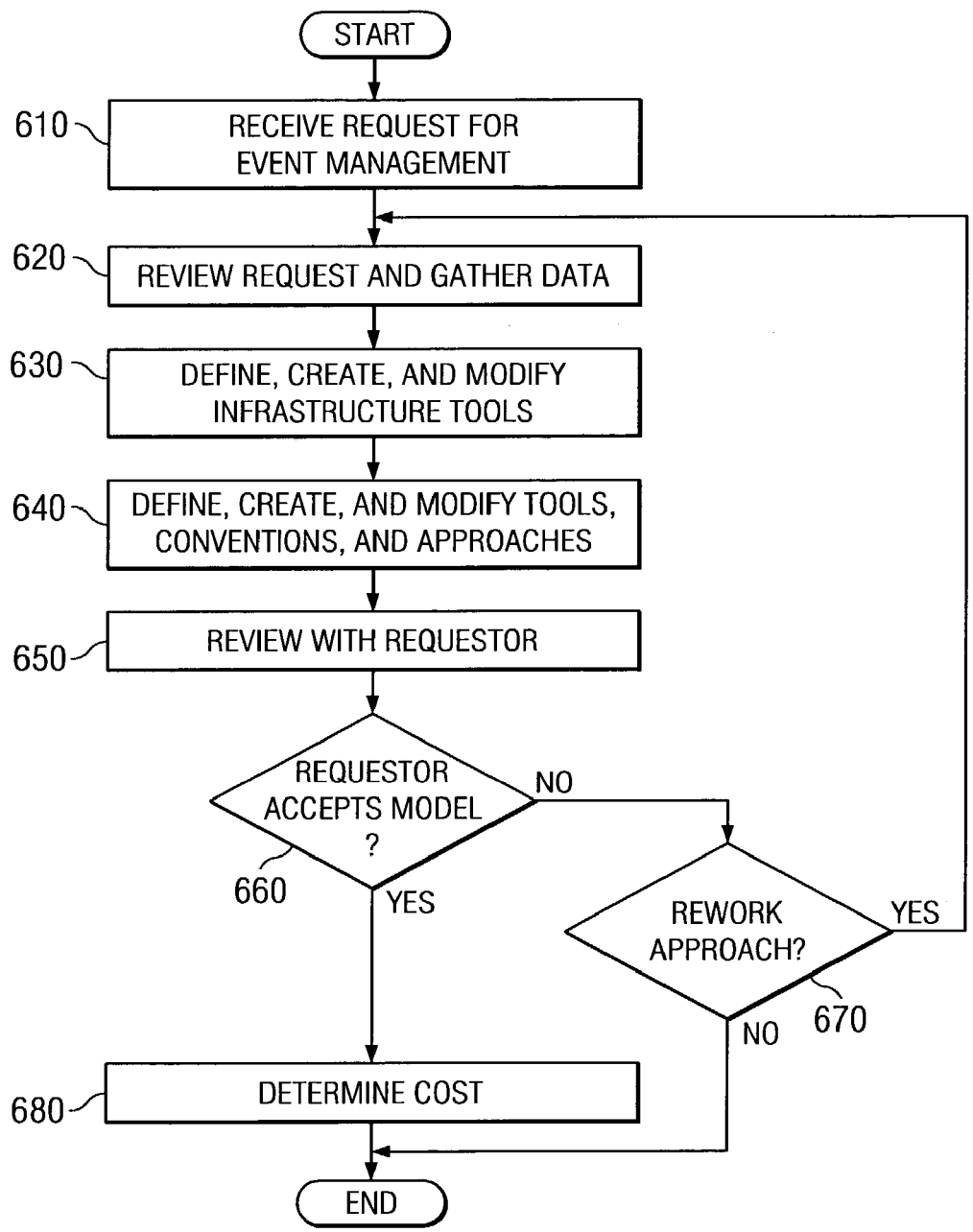
FIG. 6 is a flowchart of a process to define, create, and modify an enterprise-level business system event management structure comprising substructures that are used to perform business systems management end-to-end event management in accordance with a preferred embodiment of the present invention.

FIG. 6 is a flowchart of a process to define, create, and modify an enterprise-level business system event management structure comprising substructures that are used to perform business systems management end-to-end event management in accordance with a preferred embodiment of the present invention. For example, process 460 in FIG. 4 is such a process.

A request is received, which consists of all requirements for event management, or updates that require modification to the existing substructures (step 610). The request is reviewed and data is gathered (step 620). Infrastructure tools are defined, created, and modified (step 630). Scope and policy data, such as service level commitments, enterprise strategies, business policies, and contracts, are gathered so that tables can be created or modified to guide in the development of the substructures. Tools, conventions, and approaches to be used in event management are defined, created, and modified (step 640). Step 640 is described in more detail in FIG. 10. Once all substructures have been identified, a model of the enterprise-level business system event management structure is reviewed with the requester (step 650). A determination is made as to whether the model is accepted (step 660). If the model is accepted, the costing for the enterprise-level business system event management structure is determined (step 680) with the process terminating thereafter. Otherwise, if the model is not accepted, a determination is made as to whether to rework the approach (step 670). If the approach is to be reworked, the process returns to step 620. Otherwise, if the approach is not to be reworked, the process terminates thereafter.

Figure 10:
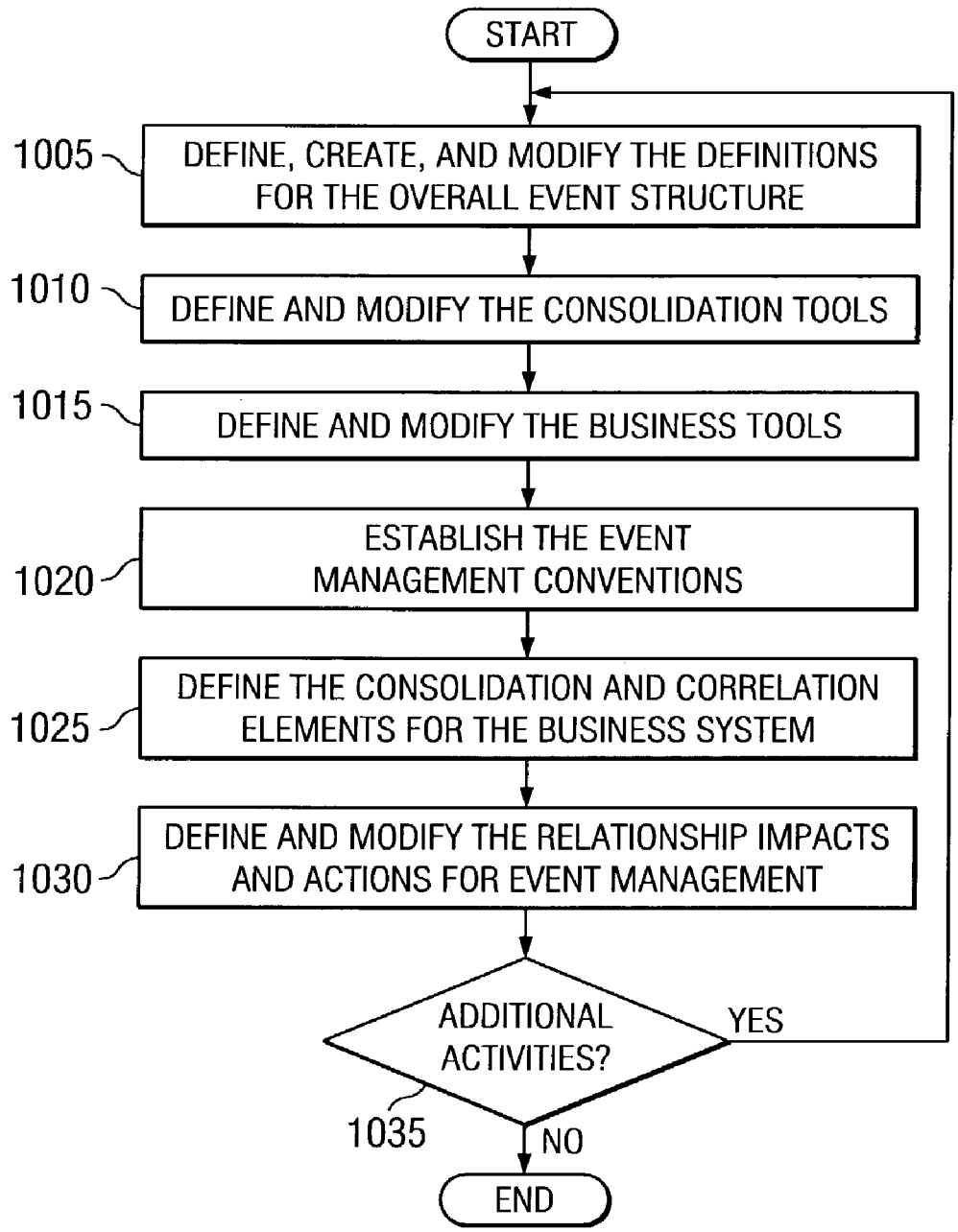
FIG. 10 is a flowchart of a process for defining, developing, and modifying tools, conventions, and approaches to be used in event management.

Turning to FIG. 10, FIG. 10 is a flowchart of a process for defining, developing, and modifying tools, conventions, and approaches to be used in event management in accordance with a preferred embodiment of the present invention. Definitions are defined, created, and modified for the overall business system enterprise-level business system event management structure (step 1005). The business processes are reviewed to determine the processes and applications installed and running on the various platforms of the business system and which processes and applications to monitor for event management. A set of system management tools are identified, defined, and modified to effectively probe and monitor the availability, capacity, performance, and transactions associated with the business processes and applications. Consolidation tools are defined and modified as needed (step 1010). Consolidation tools include tools for consolidating, correlating, and synchronizing event management environments across geographical boundaries, such as across delivery centers in a single geography, for example the U.S., or between delivery centers in different geographies. Delivery centers deliver services to one or more external accounts. Consolidation tools also include tools, which update the data warehouse, configuration database, and requirements for monitoring the business system. The business tools are defined and modified (step 1015). Business tools define the rules and policies for the business system, the relationship mapping of the business system, and the translation of the business impacts. Business tools are developed to determine the significance of whether or not an event (or set of events) has an impact on the business system. The event management conventions are established (step 1020). The severity and thresholds of events are defined and modified, such as setting the threshold for CPU and DASD utilization on a server at 80%. For example, when DASD utilization on a server reaches 80%, a request to balance DASD usage among various user groups or to add more DASD capacity may be initiated. Naming conventions for IT components and a standard set of monitors that must be deployed on all defined types of machines are defined and modified. The consolidation and correlation components for the business system are defined (step 1025). The approach and activities for consolidating the event management environment across technical towers (i.e., for allowing management of events at the enterprise level) are defined and modified. Activities involved in performance and capacity testing for new and updated business application deployments are also defined and modified. Relationship impacts and actions for event management are defined (step 1030). Bi-directional synchronization between systems management levels, including enterprise logical layers, such as infrastructure, applications, and business processes, are defined and modified. Relationship impacts and actions are used in the management of the event situations. For example, an event in one tower of management may impact the ability of the enterprise as a whole to fulfill business commitments; thus, the impact of events in the enterprise must be determined from the relationships among components in the business system. A determination is made as to whether or not additional activities exist to define, create, and modify tools, conventions, and approaches (step 1035). If additional activities exist, the process returns to step 1005. Otherwise, if additional activities do not exist, the process terminates thereafter.

Figure 7:
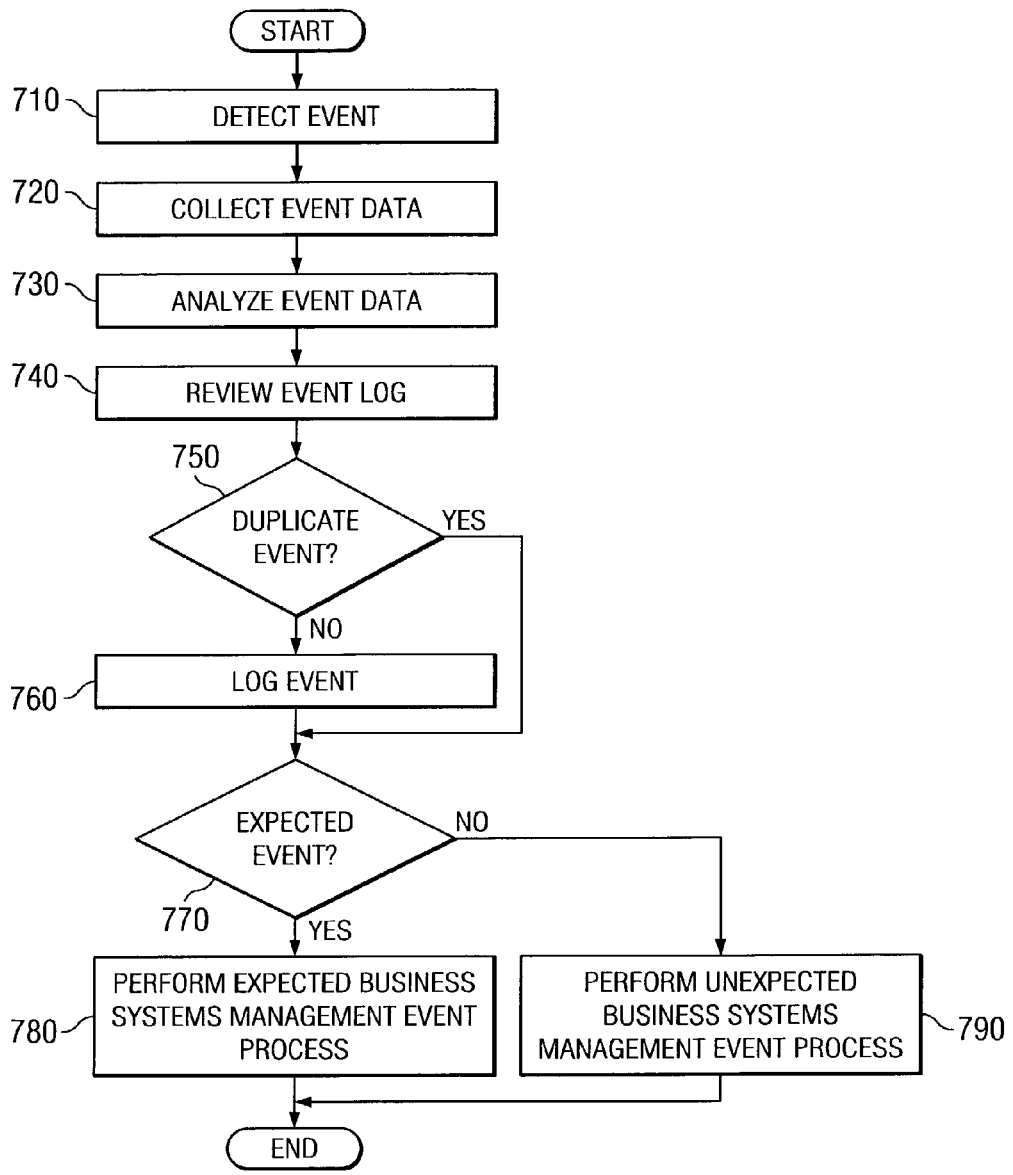
FIG. 7 is a flowchart of a process of performing business systems management end-to-end event management in accordance with a preferred embodiment of the present invention.

Next, FIG. 7 is a flowchart of a process to perform business systems management end-to-end event management in accordance with a preferred embodiment of the present invention.

An event is detected by an automated or manual monitor or sensor, which can include IT or external sources that have been defined and deployed to support the business system (step 710). This could be, for example, a monitor for hardware, software, business processes and transactions. Event data is collected by underlying tool(s) and flows as appropriate through the business system management infrastructure for analysis (step 720). The event data is analyzed (step 730). The event log is reviewed to verify whether the event has occurred previously (step 740). A determination is made as to whether the event is a duplicate event (step 750). If the event is a duplicate, the process moves to step 770. Otherwise, if the event is not a duplicate, the event is logged (step 760) with the process continuing to step 770. A determination is made as to whether the event is an expected event (step 770). If the event is an expected event, the process moves to step 780. The expected business systems management event process is performed (step 780), with the process terminating thereafter. Step 780 is defined further in FIG. 8. Otherwise, if the event is not expected, the process moves to step 790. The unexpected business systems management event process is performed (step 790), with the process terminating thereafter. Step 790 is described in more detail in FIG. 9.

Figure 8:
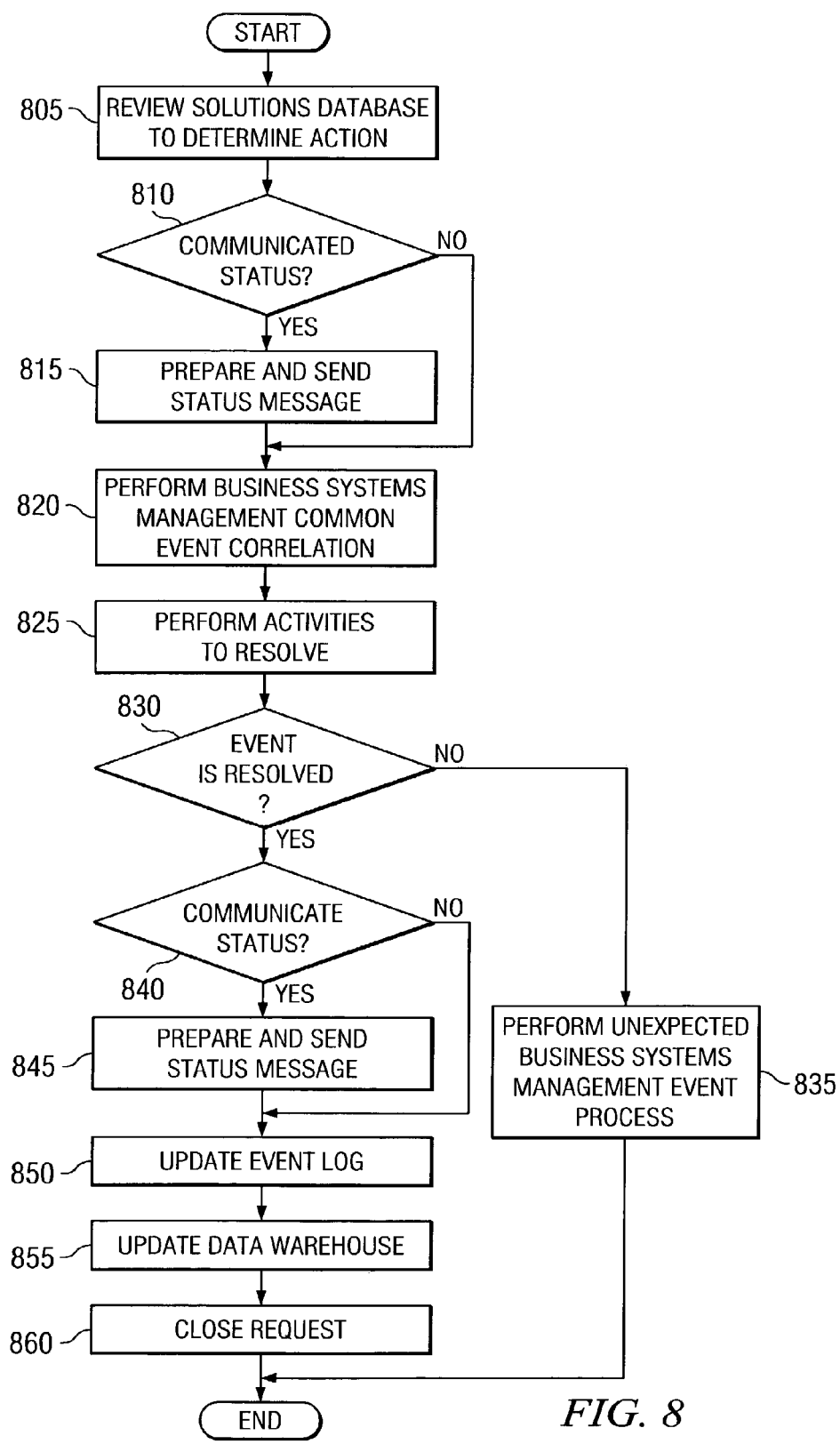
FIG. 8 is a flowchart of a process of managing expected business system events in accordance with a preferred embodiment of the present invention.

FIG. 8 is a flowchart of an expected business systems management event process in accordance with a preferred embodiment of the present invention.

When an expected event occurs, the expected event solutions database is reviewed to determine the action to perform (step 805). A determination is made as to whether to communicate the status (step 810). If the status is not to be communicated, the process moves to step 820. Otherwise, if the status is to be communicated, the status message is prepared and sent (step 815) with the process continuing to step 820. Business systems management common event correlation is performed (step 820).

Business systems management common event correlation is comprised of functions, such as the analysis of multiple events from different event sources by correlating the events in the context of the priorities of the different levels of IT and business hierarchy. This hierarchical correlation may cross enterprise and geographical boundaries, so that cause-effect and other relationships that span multiple enterprises or geographical regions may be identified, for example. The hierarchy of correlation includes support for items, such as multiple distributed lower tiers of the delivery organizations/towers, a consolidation/integration layer, and business correlation layer for the business users.

Activities are performed to resolve the expected event (step 825). A determination is made as to whether the event has been resolved (step 830). If the event has not been resolved, the unexpected business systems management event process is performed (step 835) with the process terminating thereafter. Otherwise, if the expected event has been resolved, a determination is made as to whether to communicate the status of the event (step 840). If the status is not to be communicated, the process moves to step 850. Otherwise, if the status is to be communicated, the status message is prepared and sent (step 845) with the process continuing to step 850. The event log is updated (step 850) and the data warehouse is updated (step 855). The request is closed (step 860) with the process terminating thereafter.

Figure 9:
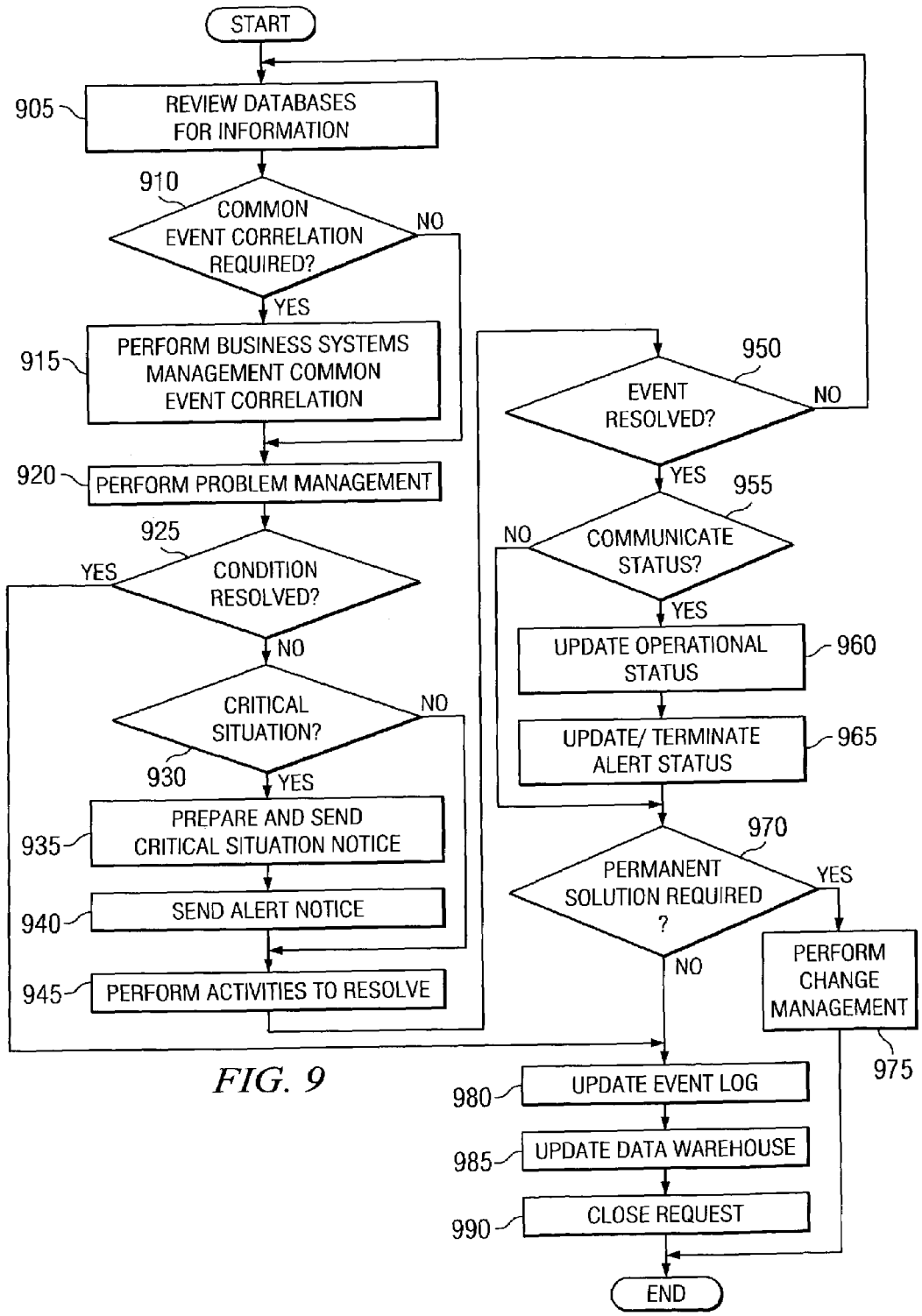
FIG. 9 is a flowchart of a process of managing unexpected business system events in accordance with a preferred embodiment of the present invention.

FIG. 9 is a flowchart of an unexpected business systems management event process in accordance with a preferred embodiment of the present invention.

When an unexpected event occurs, databases, such as the expected event solutions, data warehouse, and configuration databases, are reviewed for information to guide in resolving the event (step 905). A determination is made as to whether common event correlation is required (step 910). If common event correlation is not required, the process moves to step 920. For example, this may occur when an event is known to have potential critical impact on a contracted service. Otherwise, if the common event correlation is required, business systems management common event correlation is performed (step 915). Problem management is performed (step 920). A determination is made as to whether the condition is resolved (step 925). If the condition is resolved, the process moves to step 980. Otherwise, if the condition is not resolved, a determination is made as to whether the situation is critical (step 930). If the situation is not critical, the process moves to step 945. Otherwise, if the situation is critical, a critical situation notice is prepared and sent (step 935) and alert notice is sent (step 940) with the process continuing to step 945. Activities are performed to resolve the unexpected event (step 945). A determination is made as to whether the event has been resolved (step 950). If the event has not been resolved, the process returns to step 905. Otherwise, if the expected event has been resolved, a determination is made as to whether to communicate the status of the event (step 955). If the status is not to be communicated, the process moves to step 970. Otherwise, if the status is to be communicated, the operational status is updated (step 960) and the alert status is updated or terminated (step 965) with the process continuing to step 970. A determination is made as to whether a permanent solution is required (step 970). If a permanent solution is required, change management is performed (step 975) with the process terminating thereafter. Otherwise, if a permanent solution is not required, the process continues with step 980. The event log is updated (step 980) and the data warehouse is updated (step 985). The request is closed (step 990) with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system-based method for managing events in a business system, the business system having a plurality of components, the method comprising:
    receiving a set of business system operational constraints;
    determining relationships among the plurality of components;
    identifying at least one potential impact of at least one of the plurality of components on an ability of the business system to fulfill at least one constraint from the set of business system operational constraints;
    defining an enterprise-level business system event management structure that includes a plurality of event management substructures, wherein the plurality of event management substructures are selected and organized into the enterprise-level business system event management structure in a manner anticipated to fulfill the set of business system operational constraints, and wherein the plurality of event management substructures include a plurality of monitors that monitor for events and include a plurality of tools, constraints, and approaches used to perform event management;
    identifying business metrics for the business system corresponding to the set of business system operational constraints, wherein requirements for monitoring the business system are updated, wherein the business metrics measure performance of business processes, wherein the business processes are reviewed to determine a plurality of processes and applications that are installed and executed in the business system and to select at least a portion of the plurality of processes and applications to monitor for event management, and wherein at least a portion of the plurality of event management substructures is modified;
    detecting an event using at least one of the plurality of monitors, wherein the event includes event data;
    assessing a potential impact of the event at an enterprise level based upon the at least one potential impact of the at least one of the plurality of components on the ability of the business system to fulfill the at least one constraint from the set of business system operational constraints and based upon the relationships among the plurality of components using the plurality of event management substructures; and
    storing the event data in a storage device.

2. The method of claim 1 further comprising:
    defining data warehouse and configuration databases;
    creating the data warehouse and configuration databases; and
    storing the event data and component data in the data warehouse and configuration databases.

3. The method of claim 1, wherein the business metrics guide in defining the plurality of event management substructures.

4. The method of claim 1, wherein the business metrics are at least one of a number of escalations, a number of process improvements, a number of process non-compliances, a percentage of failures, and a percentage of reassigned requests.

5. The method of claim 1 further comprising:
    organizing data acquired from the plurality of event management substructures for presentation to a custom.

6. The method of claim 1, wherein the plurality of components include at least one of hardware, software, infrastructure, networks, data, databases, processes, and procedures.

7. The method of claim 1, wherein the assessing step includes:
    determining at least one of an availability, a state, a performance level, a capacity, a trend, and a model for the at least one of the plurality of components.

8. The method of claim 1 further comprising:
    determining costing for the enterprise-level business system event management structure.

9. The method of claim 1 further comprising:
    determining if the event is one of an expected event or an unexpected event.

10. The method of claim 9 further comprising:
    responsive to determining that the event is an expected event, performing an expected event process to resolve the expected event;
    responsive to determining that the event is an unexpected event, performing an unexpected event process to resolve the unexpected event; and
    wherein the expected event process is different from the unexpected event process.

11. The method of claim 1, wherein the relationships among the plurality of components include business processes, technology platforms, physical space, location, connectivity, and applications.

* * * * *